Aug. 17, 1937.　　　　　L. HEIDGER　　　　　2,090,198

ELECTRIC FENCE

Filed Feb. 11, 1935

INVENTOR
Leonard Heidger
BY
Eugene H. Simpson
ATTORNEY

Patented Aug. 17, 1937

2,090,198

UNITED STATES PATENT OFFICE 2,090,198

ELECTRIC FENCE

Leonard Heidger, West Allis, Wis.

Application February 11, 1935, Serial No. 5,951

REISSUED

6 Claims. (Cl. 256—10)

This invention relates to a stock fence using electricity to prevent animals from rubbing against the fence and breaking it.

One type of electric fence now in use employs a relatively strong current with a thermally operated circuit breaker which will automatically disconnect the current for sufficient time to enable the animal to free itself. This type of electric fence has been found to be unsatisfactory as it gives the animal too severe a shock when the current is flowing and time to break the fence while the current is disconnected.

A second type of electric fence employs an induction coil, or spark coil. The ordinary spark coil employed has an interrupter which vibrates rapidly and draws a constant heavy current of electricity which gives the animal too severe a shock.

One object of the present invention is to produce an electric fence which with a minimum amount of electricity will give an animal a shock sufficient to cause it to back away or avoid the fence, but not severe enough to cause the animal any harm.

Another object is to produce an electric fence in which the severity of the shock may be varied to suit different animals or changes in weather conditions.

A further object is to produce an electric fence which is adapted to operate on either alternating or direct current.

Other objects are to reduce the cost of manufacture, operation and erection of fences, and increase the efficiency of the fence.

These objects are accomplished by means of a transformer having one side thereof connected to a fence wire and having a current breaker comprising a magnetically actuated pendulum to make and break the circuit through the transformer and send timed electrical pulsations through the transformer and on to the fence wire.

The drawing shows one form of apparatus falling within the terms of the invention.

In the drawing:—

Figure 1:
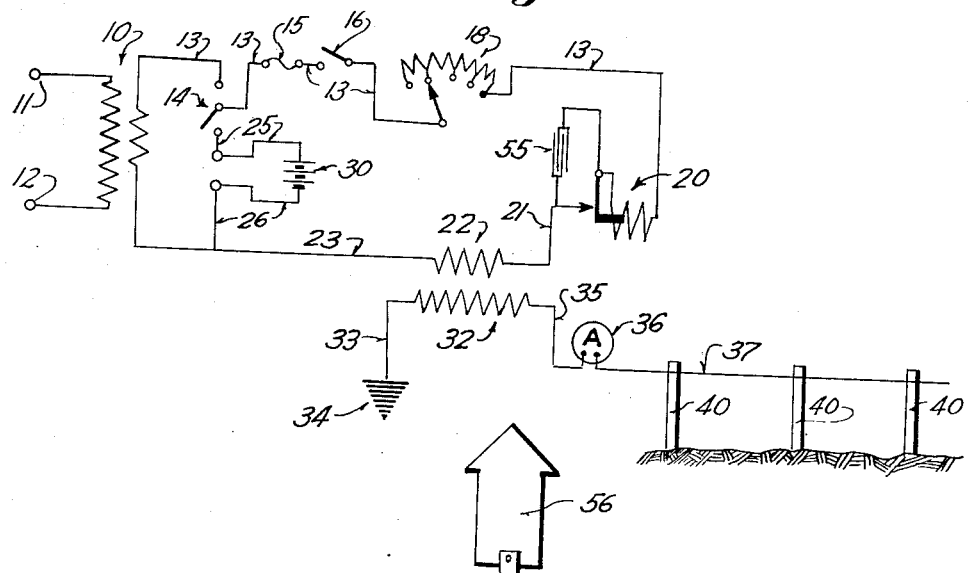
Fig. 1 is a diagrammatic view of the apparatus embodying the invention.
Figure 2:
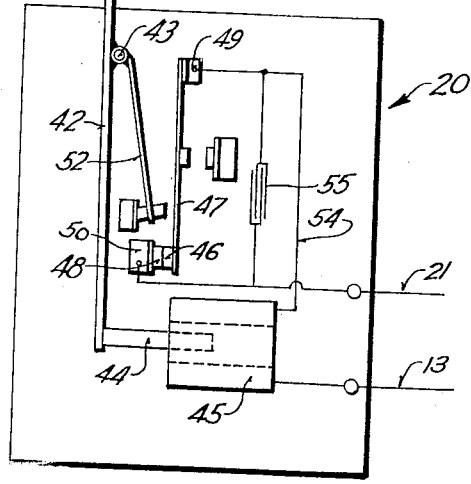
Fig. 2 is a plan view of the current interrupter.

The apparatus shown in Fig. 1 comprises a step-down transformer 10 which may connect through contacts 11 and 12 to a regular 110 volt alternating current outlet, and supplies current through a wire 13, a single pole, double throw switch 14, a fuse 15, and a snap switch 16, to a rheostat 18, the rheostat 18 being variable to regulate the current in the circuit 13. From the rheostat 18 the current flows through the wire 13 to one side of a current interrupter 20 which is shown in Fig. 2 and will be described in detail below. From the interrupter 20 the current flows through a wire 21, to the primary 22 of an induction coil and returns to the transformer 10 through a wire 23.

The secondary, or high tension winding 32 of the induction coil has one side 33 grounded as at 34, while the other side connects to a wire 35 running through a milli-ammeter 36 to a bare fence wire 37. The fence wire 37 is supported a suitable distance above the ground by spaced non-metallic fence posts 40, in the usual manner. The milli-ammeter indicates the condition of the fence and the leakage between the fence and the ground. It thus forms a guide to set the rheostat 18. The milli-ammeter also indicates when cattle touch the fence as it registers a greater flow of current when animals are in contact with the fence.

Where 110 v.-A. C. is not available the switch may be thrown to complete the circuit through wires 25 and 26 to a battery 30.

The current interrupter 20 is shown in detail in Fig. 2 and comprises an arm 42 pivoted on a pin 43, a soft iron plunger 44 which together form a pendulum, a solenoid 45 and a movable contact 46 mounted on a spring 47, and normally in contact with a fixed contact 48 to close the circuit through the primary 22 of the induction coil.

The spring contact arm is fastened to the base of the interrupter 20 through a bracket 49, while a second bracket 50 carries the stationary contact 48.

A second spring arm 52 is pivoted to the pin 43 and moves in unison with the arm 42 to separate the contacts 46 and 48.

The current enters through the wire 13 flows through the solenoid 45 and the wire 54, through the spring arm 47 through the contacts 46 and 48 and out through the wire 21.

When the switch 16 is closed current flows through the solenoid 45 which draws the plunger 44 into the solenoid. When the plunger 44 is drawn into the solenoid 45, the arm 52 disengages the contacts 46 and 48 at the beginning of its swing to break the circuit. The primary circuit is thus normally open, as shown best in Fig. 1, and is closed only for a brief moment at the end of the plunger swing.

A condenser 55 may be interposed across the contacts 46 and 48 to prevent sparking. The interrupter 20 also acts as a choke coil to limit the flow of current to the coil 22—32.

The rate of vibration of the interrupter 20 is relatively slow due to the design of the coil 45 and the heavy plunger 44. The slow rate of current interruptions effects a considerable saving of electricity and makes possible the economical use of a dry battery or a storage battery at 30, which is not possible when a coil with the usual vibrator is employed.

The entire apparatus described above with the exception of the fence is enclosed in a box (not shown) which may be conveniently located relative to the fence and the source of electricity. An indicator 56 may be fastened on the arm 42, and project through the box so that the operation of the apparatus may be observed from a distance.

The foregoing structure is subject to various changes and modifications without departing from the essence of the invention, and it is not, therefore, desired to limit the invention to the precise form herein shown and described, but only by the scope of the appended claims.

What is claimed as new and desired to secure by Letters Patent is:

1. An electric fence of the character described comprising, a fence wire, a source of electric current, a transformer including a primary coil and a secondary coil, a magnetically operated pendulum interrupter in series with the primary coil, said interrupter having a normally open energizing circuit connected to said source of current, which circuit is adapted to be briefly closed by said interrupter to energize the primary circuit and supply the losses of the system, and means connecting the secondary coil to the ground and said fence wire to constitute a normally open fence circuit.

2. An electric fence of the character described comprising, a fence wire, a source of electric current, a transformer including a primary coil and a secondary coil, a magnetically operated pendulum interrupter in series with the primary coil, said interrupter having a normally open energizing circuit connected to said source of current which circuit is adapted to be briefly closed by said interrupter near the termination of the pendulum swing to energize the primary circuit and supply the losses of the system, and means connecting the secondary coil to the ground and said fence wire to constitute a normally open fence circuit.

3. An electric fence as defined in claim 1 including means in the circuit of said transformer to regulate the severity of the shock on the fence.

4. An electric fence as defined in claim 2 including means in the circuit of said transformer to regulate the severity of the shock on the fence.

5. An electric fence of the character described comprising, a fence wire, a storage battery, a transformer including a primary coil and a secondary coil, a magnetically operated pendulum interrupter in series with said primary coil, said interrupter having a normally open energizing circuit connected to said storage battery which circuit is adapted to be briefly closed by said interrupter near the termination of the pendulum swing to energize the primary circuit and supply the losses of the system, and means connecting the secondary coil to the ground and said fence wire to constitute a normally open fence circuit.

6. An electric fence of the character described comprising, a fence wire, a storage battery, a transformer including a primary coil and a secondary coil, a magnetically operated pendulum interrupter in series with the primary coil, said interrupter having a normally open energizing circuit connected to said storage battery, which circuit is adapted to be briefly closed by said interrupter to energize the primary circuit and supply the losses of the system, and means connecting the secondary coil to the ground and said fence wire to constitute a normally open fence circuit.

LEONARD HEIDGER.